United States Patent Office 2,845,389
Patented July 29, 1958

2,845,389
THINNING AGENT FOR DRILLING FLUID

Horace J. Beach, Houston, William C. Goins, Jr., Bellaire, and Walter F. Rogers, Houston, Tex., assignors to Gulf Oil Corporation, Pittsburgh, Pa., a corporation of Pennsylvania No Drawing. Application July 27, 1954
Serial No. 446,154

6 Claims. (Cl. 252—8.5)

This invention concerns a method for controlling the properties of aqueous base drilling fluids containing dispersed shales or clays and has particular reference to a novel material and improved means for preventing excessive thickening or gelation of aqueous drilling muds.

In the rotary drilling of boreholes, as in the exploration for petroleum, it is conventional to circulate through the drill pipe and bit, a drilling fluid for such purposes as supporting the hole walls, lubricating the pipe and bit, flushing out bit cuttings, providing hydrostatic pressure to hold back formation fluids, and plastering the hole wall to minimize filtration of fluids out of the borehole. In order to perform these functions, the drilling fluid must have certain characteristics as regards density, viscosity, thixotropy, and filtration properties.

Drilling muds are prepared by adding finely divided clays to water until a suitable viscosity is obtained. Ground barites may be added to increase the density of the drilling mud and fluid-loss control agents, such as starch or sodium carboxymethyl cellulose, can be added to obtain the desired filtration property. The clay suspensions which constitute drilling muds are thixotropic, and especially when finely divided bit cuttings or other formation solids disperse into the mud, an undesirably increased viscosity and excessive tendency to gel occurs. In order to prevent this viscosity rise or to reduce the viscosity of a new drilling mud and in order to curtail excessive gelation, the usual practice has been to add quebracho, an extract of a wood of a South American tree, and caustic soda. Quebracho is satisfactory in use but is expensive and can be difficult to obtain.

We have found that the viscosity of drilling muds can be adequately adjusted downwardly and that the excessive gelation of such muds can be curtailed by the addition thereto of a thinning agent consisting essentially of finely divided tara pods.

Tara pods are the seed-bearing fruit of tara shrubs or prickly trees, most authoritatively termed Tara Molina, cf. Britton and Rose, North American Flora, vol. 23, p. 320 (1930), which reference also lists the following names and references:

"(1) *Tara spinosa* (Molina), Britton and Rose.
Poinciana spinosa Molina, Sagg. Chili 158. 1782.
Caesalpinia pectinata Cav. Descr. 467. 1802.
Tara tinctoria Molina, Sagg. Chili ed. 2,153. 1810.
Coulteria tinctoria H. B. K. Nov. Gen. and Sp. 6:331. 1824.
Caesalpinia spinosa Kuntze, Rev. Gen. 3²:54. 1898."

Tara pods can be added to the drilling mud either as a dried powder, a dispersion in water, a mixture of caustic and powder, or as an aqueous dispersion of caustic and powder. When the pods are finely ground, the resulting powder is largely soluble in water. Thus the powder can be added to the drilling fluid as an aqueous solution, or an aqueous solution plus a slurry of the insoluble material, or in an aqueous solution of an alkali.

Tara powder is effective as a thinning agent over a wide range of concentrations in drilling fluids and even in extremely low concentrations markedly decreases the viscosity of drilling fluids. Comminuted, dried tara pods are effectively employed in concentrations between about 0.05 percent and 2.0 percent, by weight of the drilling mud, and preferably in concentrations between 0.1 percent and 1.0 percent by weight of the mud. Concentrations in excess of 2.0 percent by weight are usually unnecessary and show little additional effect on the viscosity or gelling tendency of drilling mud. It is customary in the field to express the concentrations of thinner in terms of pounds per barrel of drilling mud, which itself can vary considerably in density. The effective range of concentration of tara powder in drilling mud is between about 0.1 to 6 pounds per barrel.

Our invention also comprehends an improved drilling composition containing, as a weighting agent, finely divided solids, e. g., clay particles, distributed in sufficient water to slurry the clay and render the mixture circulatable and between 0.05 and about 2.0 percent by weight, on a dry basis, of tara powder or an aqueous dispersion or extract of comminuted tara pods, and further includes an improved method of well drilling in which there is circulated through the drilling tool, and in return to the surface of the well, a drilling mud containing sufficient tara powder to provide an optimum viscosity and keep the drilling fluids circulatable even when it contains accumulated finely divided bit cuttings and like formation particles.

It is preferred to remove the seeds from the whole tara pod before comminuting the pods because the seeds exhibit a detrimental effect when they are ground with and included in the finely divided thinning agent. However, in some instances it may be more convenient to grind the whole tara pod and this resulting finely divided material is effective as a thinning agent. The active principle appears to be contained in the water soluble portion of the tara powder and consequently more concentrated material can be obtained by a water extraction of the powder. The mixture of tara powder and water can be filtered and the filtrate can be used as a thinning agent either in dry or liquid form. A caustic soda and water extract of the tara powder, subsequently filtered and dried, is effective as a thinning agent.

In some instances it will be preferable to add an alkali, e. g., an alkali metal hydroxide, to the tara powder, or the drilling mud, to adjust upwardly the mud to a pH of about 9, and the preferred range of concentration of alkali is between about 1 percent and 100 percent by weight based on the weight of the tara powder. However, as demonstrated in certain of the specific examples hereafter given, tara pods are notably effective when they alone are employed as a thinner.

The following specific examples particularly illustrate the effectiveness of tara powder in reducing the viscosity and gelling tendency of a freshly prepared drilling mud which contains a clay, Wyoming bentonite, and water. The pH of the drilling mud was adjusted to 9.5 with caustic soda and it was then allowed to hydrate overnight. The viscosity, gel strength, and filterability of the drilling mud were tested in accordance with the methods described in API Bulletin RP 29, 3rd edition, May 1950, entitled "Recommended Practice for Standard Field Procedure for Testing Drilling Fluids, American Petroleum Institute." The drilling mud was found to have a Stormer viscosity of 119.8 centipoises, an initial gel strength of 165 grams and of 225 grams after 10 minutes, and, in a filtration test in which a cake of 3/32" was formed, a recovered filtrate of 11.9 milliliters.

*Example I*

When ground tara pod was added to the above drilling fluid in a concentration of 0.25 pound of tara powder per barrel of fluid, the viscosity was reduced to 61.1 cps., the initial gel strength to 70 gm., the gel strength after 10 minutes to 93 gm., and the filtration test results were not substantially altered. Quebracho in the same amount lowered the viscosity to only 79.4 cps., the initial gel strength to only 104 gm. and the gel strength after 10 minutes to 152 gm.

*Example II*

A mixture of the above described drilling fluid and tara powder was prepared in which the content of tara powder was 0.50 pound per barrel of drilling fluid. The tara powder reduced the viscosity to 53 cps., the initial gel strength to 58 gm. and the gel strength after 10 minutes to 108 gm. In the filtration test a filter cake of 3/32" was formed and a filtrate of 10.7 ml. was obtained, a reduction here of 10 percent of volume. Quebracho added to drilling mud in the same amount reduced the viscosity to only 71.2 cps., the initial gel strength to 90 gm.

*Example III*

A mixture of drilling mud and one pound of tara powder per barrel of mud was prepared and the pH was readjusted to 9.5. The addition of the tara powder reduced the viscosity to 48.6 cps., the initial gel strength to 48 gm. and the gel strength after 10 minutes to 80 gm. In the filtration test a filler cake of 3/32" was formed and a filtrate of 10.7 ml. was recovered. Quebracho added to the mud of the same amount reduced the viscosity to 65.0 cps., the initial gel strength to 79 gm. and the gel strength after 10 minutes to 123 gm.

*Example IV*

Tara powder was mixed with the drilling mud in the amount of 2 pounds of powder per barrel of mud and the pH was readjusted to 9.5 with caustic solution. The tara powder reduced the viscosity to 45.0 cps., the initial gel strength to 31 gm. and gel strength after 10 minutes to 60 gm. In the filtration test in which a filter cake of 3/32" was formed a filtrate of 9.3 ml. was recovered. Quebracho added in the same amount reduced the viscosity to 63.7 cps., the initial gel strength to 80 gm. and the gel strength after 10 minutes to 114 gm.

In the above specific example, quebracho has been employed as a basis for comparison since it is widely used at the present time as a thinner. As may be seen by the above specific examples, tara powder is more effective than quebracho in reducing viscosity and gelation of the drilling fluids.

As aforementioned, another important use of the tara powder or its solution is the thinning and reduction in viscosity of drilling muds which have become thickened and gelled from an accumulation of finely divided clay or bit cuttings accumulated by the drilling mud during the drilling operation. The problem of gelling and excessive viscosity is especially acute when cement, left in the casing as a result of the casing-cementing operation, is drilled out. In the following specific example tara powder was employed as a thinner to correct the viscosity characteristics of a sample of drilling mud which contained about 60 gm. of hydrated Wyoming bentonite per liter. The drilling fluid contained Portland cement in a concentration of about 4 gm. per liter and the viscosity of the drilling mud was too thick for it to be tested for viscosity.

*Example V*

Tara powder was added to the described drilling mud in an amount equivalent to about 2 gm. per liter of the mud. The viscosity was reduced by the added tara powder to 96 cps. Quebracho in the same amount lowered the viscosity to 100.7 cps. When the concentration of tara powder was increased to 3.0 gm. per liter, the viscosity was reduced to 76.0 cps. and when a total of 4 gm. per liter of tara powder had been added the viscosity was reduced to 63.6 cps.

In the drilling of a well at a depth of 4200 feet and while making hole with a natural sea water drilling mud, difficult conditions were encountered and to meet this situation a medium pH, sodium-carboxymethylcellulose-containing mud was then employed. The mud picked up a high solids content and to thin the mud and reduce its viscosity water and 1100 pounds of tara powder were added to 800 barrels of the drilling mud. The tara powder was effectively employed as a thinner in the operation.

Numerous other circumstances arise in drilling operations, as is well known in the art, when it is necessary or desirable to thin the drilling mud. The relative availability of tara powder and its special effectiveness in aqueous drilling muds enhances its utility for the described purposes.

Having described our invention, we claim:

1. A drilling composition consisting essentially of a finely divided clay, sufficient water to slurry the clay and render it circulatable and between about 0.05 percent and 2.0 percent, by weight of the aqueous clay slurry, of dried comminuted tara pods.

2. A drilling mud consisting essentially of a finely divided clay, a weighting agent, sufficient water to slurry the finely divided clay and weighting agent and render the slurry circulatable, and between 0.2 and 6 pounds of dried finely divided tara pods per barrel of drilling mud.

3. A drilling mud comprising a finely divided clay, water in an amount sufficient to slurry the clay and render it circulatable, between about 0.05% and 2.0%, by weight of the aqueous clay slurry, of finely divided tara pods, and between 1% and 100%, by weight based on the weight of the tara pods, of an alkali metal hydroxide to adjust the pH of the mud to about 9.

4. A thinning agent for the reduction of the viscosity and gel strength of drilling mud consisting essentially of finely divided tara pods and between 1 and 100 percent, by weight based on the weight of the tara pods, of an alkali metal hydroxide.

5. A process of drilling a well comprising drilling a borehole into a formation with a rotary bit, circulating a suspension of finely divided clay particles down into the borehole and up out of the borehole to carry cuttings therefrom, and adding to the suspension circulated in the well between 0.05% and about 2.0%, based on the weight of the suspension, of finely divided tara pods to reduce the viscosity and the gel strength of the suspension.

6. A process of drilling a well comprising drilling a borehole into a formation with a rotary bit, circulating a suspension of finely divided clay particles down into the borehole and up out of the borehole to carry cuttings therefrom, adding to the suspension circulated in the well between 0.05% and 2.0%, based on the weight of the suspension, of finely divided tara pods to reduce the viscosity and the gel strength of the suspension, and adding an alkali metal hydroxide to the suspension in amounts of about 1.0% to 1000% of the tara pods to increase the pH of the suspension to approximately 9.

References Cited in the file of this patent

UNITED STATES PATENTS 2,560,930    Campise _____ July 17, 1951

OTHER REFERENCES

Rogers: Composition and Properties of Oil Well Drilling Fluids, 2nd edition, pub. 1953 by Gulf Pub. Co. of Houston, Texas, page 322.

Huc: Tannage of Sheep Skins with Tara, Chemical Abstracts, vol. 33, page 4073.

Sola: The Use of the Tannin of the Pods of *Caesalpinia tinctoria*, Chemical Abstracts, vol. 35, page 1543.

Rogers et al.: Leaching and Tanning Experiments with Tara Pods, Chemical Abstracts, vol. 36, page 2438.

Ratto: Peru Would be a Producer of Tannin by Industrialization of Tara, Chemical Abstracts, vol. 39, page 3683.